US011888243B2

(12) United States Patent
Okada et al.

(10) Patent No.: US 11,888,243 B2

(45) Date of Patent: Jan. 30, 2024

(54) ANTENNA AND MILLIMETER-WAVE SENSOR

(71) Applicant: SONY SEMICONDUCTOR SOLUTIONS CORPORATION, Kanagawa (JP)

(72) Inventors: Yasuhiro Okada, Kanagawa (JP); Kenichi Kawasaki, Kanagawa (JP); Sachio Iida, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 355 days.

(21) Appl. No.: 17/423,207

(22) PCT Filed: Dec. 2, 2019

(86) PCT No.: PCT/JP2019/046949

§ 371 (c)(1),
(2) Date: Jul. 15, 2021

(87) PCT Pub. No.: WO2020/152987

PCT Pub. Date: Jul. 30, 2020

(65) Prior Publication Data

US 2022/0109239 A1 Apr. 7, 2022

(30) Foreign Application Priority Data

Jan. 23, 2019 (JP) ................................. 2019-009598

(51) Int. Cl.
*H01Q 21/06* (2006.01)
*H01Q 9/04* (2006.01)

(52) U.S. Cl.
CPC ............. *H01Q 9/0421* (2013.01); *H01Q 9/04* (2013.01); *H01Q 21/06* (2013.01)

(58) Field of Classification Search
CPC ......... H01Q 9/0421; H01Q 9/04; H01Q 21/06
(Continued)

(56) References Cited

U.S. PATENT DOCUMENTS 5,121,127 A * 6/1992 Toriyama ................. H01Q 5/40 343/700 MS
5,696,372 A * 12/1997 Grober ................... H01Q 9/285 343/795
(Continued)

FOREIGN PATENT DOCUMENTS

CN 105765404 A 7/2016
CN 107004956 A 8/2017
(Continued)

OTHER PUBLICATIONS

International Search Report and Written Opinion of PCT Application No. PCT/JP2019/046949, dated Feb. 10, 2020, 09 pages of ISRWO.

*Primary Examiner* — Hai V Tran

(74) *Attorney, Agent, or Firm* — CHIP LAW GROUP

(57) ABSTRACT

An antenna (1) according to the present disclosure includes a plate-shaped transparent dielectric member (10), a patch antenna (20), a ground plane (30), and a transparent conductive film (40). The patch antenna (20) is disposed on a front face (11) of the transparent dielectric member (10) and includes holes portions (22) inside the patch antenna (20). The ground plane (30) is disposed on a back face (12) of the transparent dielectric member (10) and includes hole portions (32) inside the ground plane (30). The transparent conductive film (40) is disposed at the hole portions (22) of the patch antenna (20).

11 Claims, 10 Drawing Sheets

(58) Field of Classification Search
USPC .......................................................... 343/702
See application file for complete search history.

(56) References Cited

U.S. PATENT DOCUMENTS

| | | | | |
|---|---|---|---|---|
| 2003/0142018 | A1* | 7/2003 | Lange .................... | H01Q 1/007 343/897 |
| 2010/0045546 | A1* | 2/2010 | Tao ...................... | A61B 5/0507 343/711 |
| 2014/0104157 | A1 | 4/2014 | Burns et al. | |
| 2014/0106684 | A1* | 4/2014 | Burns .................... | H01Q 21/28 29/601 |
| 2016/0093939 | A1* | 3/2016 | Kim ......................... | H01Q 1/44 343/720 |
| 2016/0190678 | A1* | 6/2016 | Hong ..................... | H01Q 1/364 343/700 MS |
| 2016/0291146 | A1 | 10/2016 | Wang et al. | |
| 2017/0373397 | A1 | 12/2017 | Yashiro et al. | |

FOREIGN PATENT DOCUMENTS

| | | | |
|---|---|---|---|
| CN | 110419145 | A | 11/2019 |
| JP | 2006-303846 | A | 11/2006 |
| JP | 2013-257755 | A | 12/2013 |
| JP | 2018-182734 | A | 11/2018 |
| WO | 2015/075072 | A1 | 5/2015 |
| WO | 2016/098763 | A1 | 6/2016 |
| WO | 2018/186375 | A1 | 10/2018 |

* cited by examiner

ANTENNA AND MILLIMETER-WAVE SENSOR

CROSS REFERENCE TO RELATED APPLICATIONS

This application is a U.S. National Phase of International Patent Application No. PCT/JP2019/046949 filed on Dec. 2, 2019, which claims priority benefit of Japanese Patent Application No. JP 2019-009598 filed in the Japan Patent Office on Jan. 23, 2019. Each of the above-referenced applications is hereby incorporated herein by reference in its entirety.

TECHNICAL FIELD

The present disclosure relates to an antenna and a millimeter-wave sensor.

BACKGROUND ART

For antennas attached on the windows of buildings or vehicles, technology has been developed nowadays for enhancing transparency of such an antenna by configuring each of a patch antenna and a ground plane in a sparse grid pattern (see, for example, PTL 1).

CITATION LIST

Patent Literature

PTL 1
Japan Patent Laid-open No. 2006-303846

SUMMARY

Technical Problem

In the above conventional technology, however, since each of the patch antenna and the ground plane is configured in the sparse grid pattern, matching with a feeding line is more difficult than in a case where each of the parch antenna and the ground plane is configured by a uniform metal thin film.

In view of this, in the present disclosure, an antenna and a millimeter-wave sensor that have high transparency and that are capable of facilitating matching with the feeding line are proposed.

Solution to Problem

According to the present disclosure, an antenna is provided. This antenna includes a plate-shaped transparent dielectric member, a patch antenna, a ground plane, and a transparent conductive film. The patch antenna is disposed on the front face of the transparent dielectric member and includes hole portions inside the patch antenna. The ground plane is disposed on the back face of the transparent dielectric member and includes hole portions inside the ground plane. The transparent conductive film is disposed at the hole portions of the patch antenna.

Further, an antenna according to an aspect of the present disclosure further includes a transparent conductive film disposed at the hole portions of the ground plane.

Advantageous Effects of Invention

According to the present disclosure, an antenna and a millimeter-wave sensor that have high transparency and that are capable of facilitating matching with a feeding line can be provided. Note that the effects of the present disclosure are not necessarily limited to the effects described above, and may include any of effects described in the present disclosure.

DESCRIPTION OF EMBODIMENTS

Hereinafter, embodiments of the present disclosure will be described in detail on the basis of the drawings. Note that, in the embodiments described below, the same portions will be denoted by the same reference signs to omit duplicated descriptions.

For antennas attached on the windows of buildings or vehicles, technology has been developed nowadays for enhancing transparency of such an antenna by configuring each of a patch antenna and a ground plane in a sparse grid pattern.

In the above conventional technology, however, since each of the parch antenna and the ground plane is configured in the sparse grid pattern, matching with a feeding line is more difficult than in a case where each of the parch antenna and the ground plane is configured by a uniform metal thin film.

This reason is that each of the patch antenna and the ground plane is configured by the sparse grid pattern, and this configuration increases an impedance of the antenna. Moreover, another reason is that each of the patch antenna and the ground plane is configured by the sparse grid pattern, and changing the arrayed pattern of the grid pattern causes large changes of matching conditions.

Thus, it has been desired to achieve an antenna that has high transparency and that is capable of facilitating matching with the feeding line.

[Embodiment]

Figure 1:
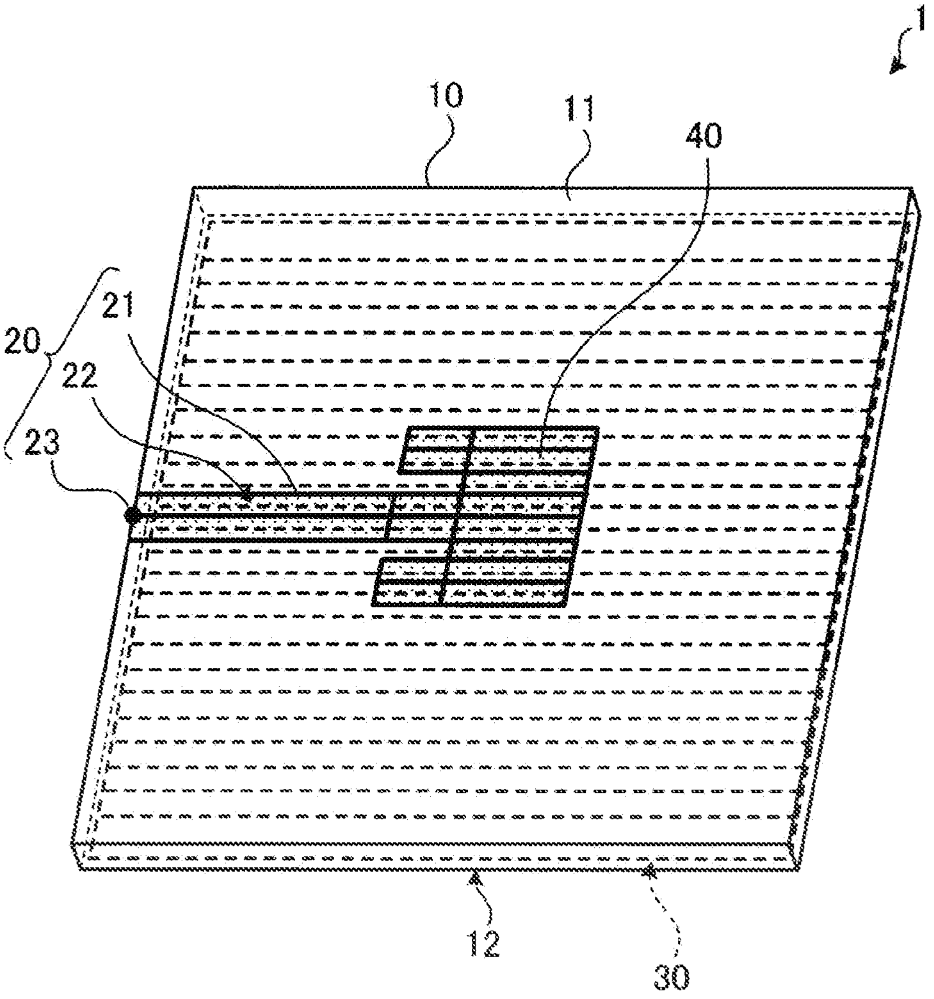
FIG. 1 is a top perspective view illustrating a configuration of an antenna according an embodiment of the present disclosure.

First, a configuration of an antenna 1 according to the present embodiment will be described referring to FIGS. 1 and 2. FIG. 1 is a top perspective view illustrating the configuration of the antenna 1 according the embodiment of the present disclosure, and FIG. 2 is a bottom perspective view illustrating the configuration of the antenna 1 according the embodiment of the present disclosure.

Figure 2:
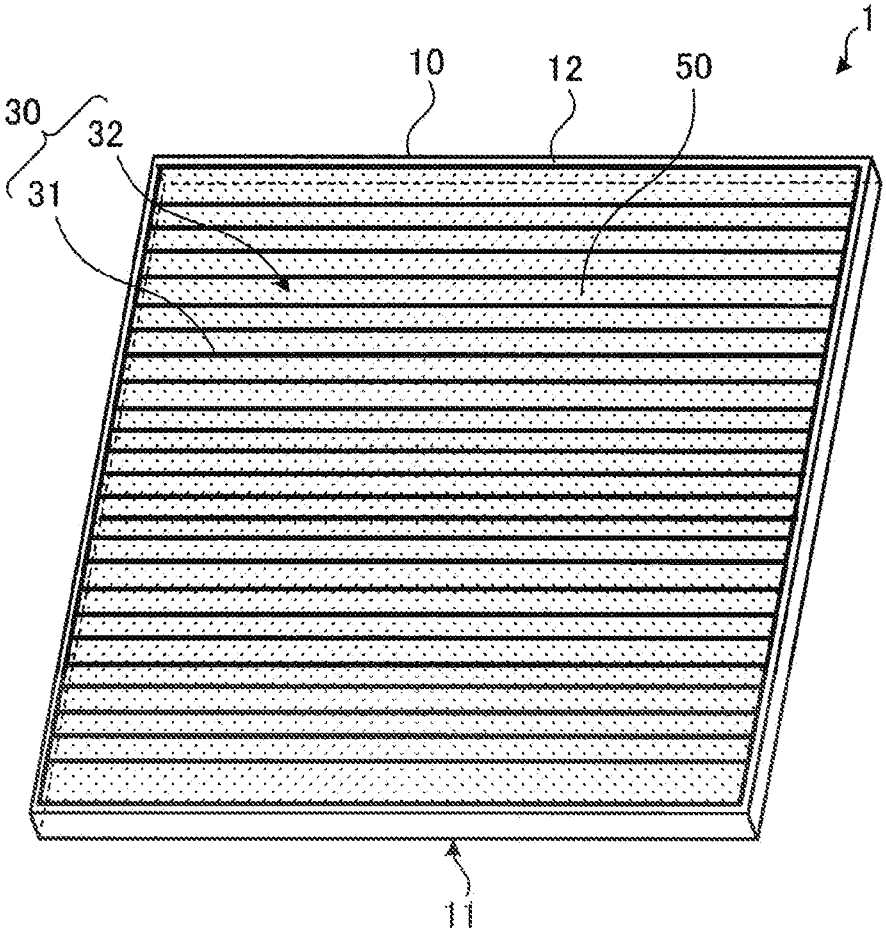
FIG. 2 is a bottom perspective view illustrating the configuration of the antenna according the embodiment of the present disclosure.

As illustrated in FIG. 1 and the like, the antenna 1 according to the present embodiment includes a transparent dielectric member 10, a patch antenna 20, a ground plane 30, a transparent conductive film 40, and a transparent conductive film 50 (see FIG. 2). Note that, for the sake of easy understanding, the illustration of the transparent conductive film 50 is omitted in FIG. 1, and the illustrations of the patch antenna 20 and the transparent conductive film 40 are omitted in FIG. 2.

The transparent dielectric member 10 includes a transparent dielectric material such as glass, resin (for example, polyimide), or Plexiglas. The transparent dielectric member 10 has a plate shape, and has a front face 11 and a back face 12 that are approximately parallel to each other. The transparent dielectric member 10 has, for example, a rectangular shape in a top view. Note, however, that the shape of the transparent dielectric member 10 is not limited to the rectangular shape.

The patch antenna 20 is disposed on the front face 11 of the transparent dielectric member 10. The patch antenna 20 includes microstrip lines 21, hole portions 22, and a feeding point 23.

The microstrip lines 21 include a metal thin film having high electric conductivity, such as copper, aluminum, or gold. The microstrip lines 21 include aggregates of lines having a predetermined pattern (for example, a grid pattern), and have, as a whole shape, a predetermined shape (for example, an approximately T-letter shape).

Note that the pattern and the whole shape of the microstrip lines 12 are not limited to those of an example illustrated in FIG. 1, and can be appropriately changed according to the wavelength of electromagnetic waves transmitted/received by the antenna 1. For example, in the example of FIG. 1, there is illustrated a case where the end portion of each of the microstrip lines 21 that is located at the center of the transparent dielectric member 10 has a rectangular shape, but the end portion may have a circular shape or any other shape.

In the inside of the patch antenna 20, a plurality of hole portions 22 is formed in each portion enclosed by a plurality of microstrip lines 21. The hole portions 22 each have, for example, a rectangular shape in a top view. In the present embodiment, such pluralities of hole portions 22 enable enhancement of the transparency of the patch antenna 20.

The feeding point 23 is a portion to which an unillustrated feeding line is electrically coupled. The patch antenna 20 is fed from an external device (for example, a millimeter-wave band RF circuit 3 (see FIG. 11)) via the feeding line and the feeding point 23.

As illustrated in FIG. 2, the ground plane 30 is disposed on the back face 12 of the transparent dielectric member 10.

That is, the patch antenna 20 and the ground plane 30 are disposed approximately parallel to each other. Further, in the antenna 1 according to the present embodiment, feeding the feeding point 23 of the patch antenna 20 forms a predetermined electric field between the patch antenna 20 and the ground plane 30, which face each other.

The ground plane 30 includes conductive members 31 and hole portions 32. The conductive members 31 include a metal thin film having high electric conductivity, such as copper, aluminum, or gold.

In the inside of the ground plane 30, a plurality of hole portions 32 is formed in each portion enclosed by a plurality of the conductive members 31. The hole portions 32 each have, for example, a rectangular shape in a top view. In the present embodiment, such pluralities of hole portions 32 enable enhancement of the transparency of the ground plane 30.

The transparent conductive film 40, which is indicated by dot hatching in FIG. 1, is a conductor thin film having transparency. The transparent conductive film 40 includes, for example, ITO (Indium Tin Oxide), FTO (Fluorine-doped Tin Oxide), ATO (Antimony Tin Oxide), AZO (Antimony Zinc Oxide), GZO (Gallium Zinc Oxide), IZO (Indium Zinc Oxide), or the like.

The transparent conductive film 40 is disposed at the hole portions 22 of the patch antenna 20, at the front face 11 side of the transparent dielectric member 10. The transparent conductive film 40 is disposed so as to, for example, cover all the plural hole portions 22.

The transparent conductive film 50, which is indicated by dot hatching in FIG. 2, is a conductor thin film having transparency. The transparent conductive film 50 includes, for example, ITO, FTO, ATO, AZO, GZO, IZO, or the like. Note that the transparent conductive film 40 and the transparent conductive film 50 may be formed by using the same material with each other, or may be formed by using materials different from each other.

The transparent conductive film 50 is disposed at the hole portions 32 of the ground plane 30, at the back face 12 side of the transparent dielectric member 10. The transparent conductive film 50 is disposed so as to, for example, cover all the plural hole portions 32.

Subsequently, individual characteristics of the antenna 1 according to the present embodiment and having been described so far will be described comparing a reference example 1 and a reference example 2. First, the reference examples 1 and 2 will be described referring to FIGS. 3 and 4.

Figure 3:
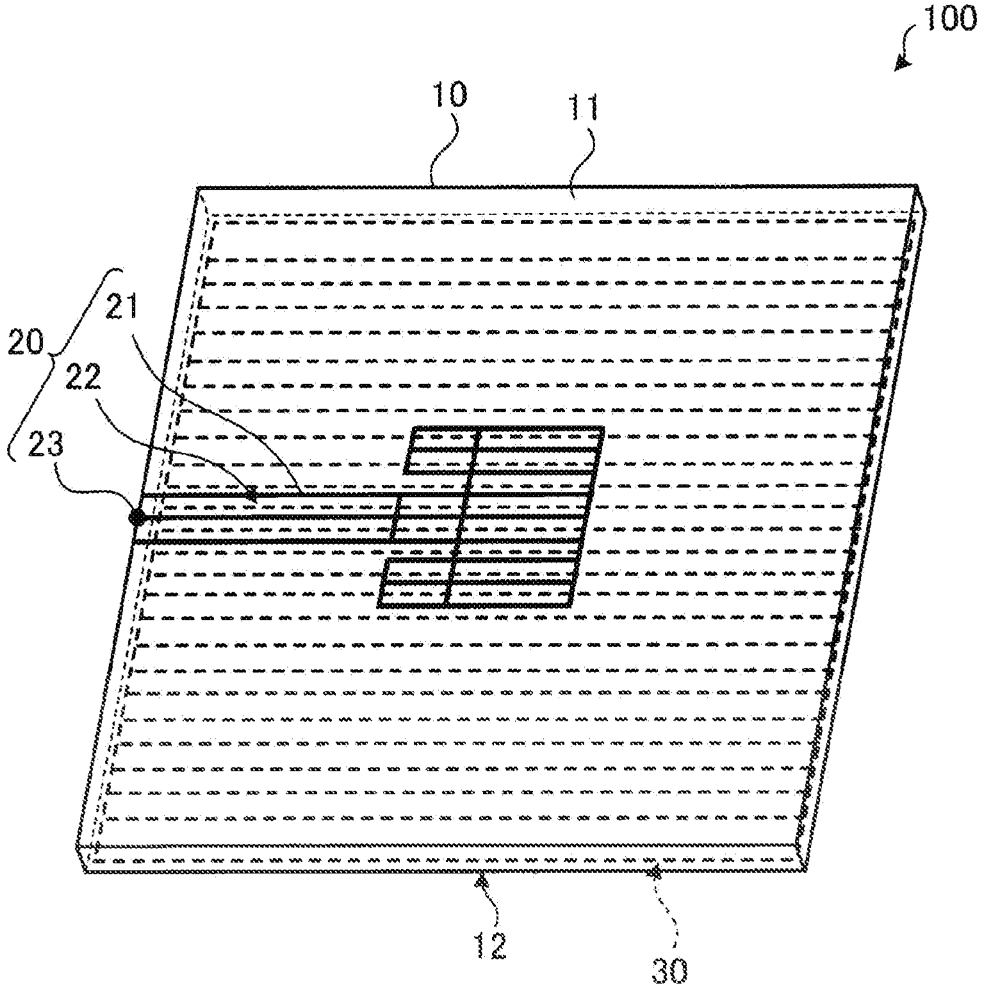
FIG. 3 is a top perspective view illustrating a configuration of an antenna in a reference example 1.

FIG. 3 is a top perspective view illustrating a configuration of an antenna 100 in the reference example 1. As illustrated in FIG. 3, the antenna 100 of the reference example 1 includes the transparent dielectric member 10, the patch antenna 20, and the ground plane 30.

Note here that the transparent dielectric member 10, the patch antenna 20, and the ground plane 30 of the antenna 100 has configurations similar to those of the present embodiment. That is, the antenna 100 of the reference example 1 has a configuration obtained by removing the transparent conductive film 40 and the transparent conductive film 50 from the antenna 1 of the present embodiment. Thus, the antenna 100 of the reference example 1 has high transparency, similarly to the present embodiment.

Figure 4:
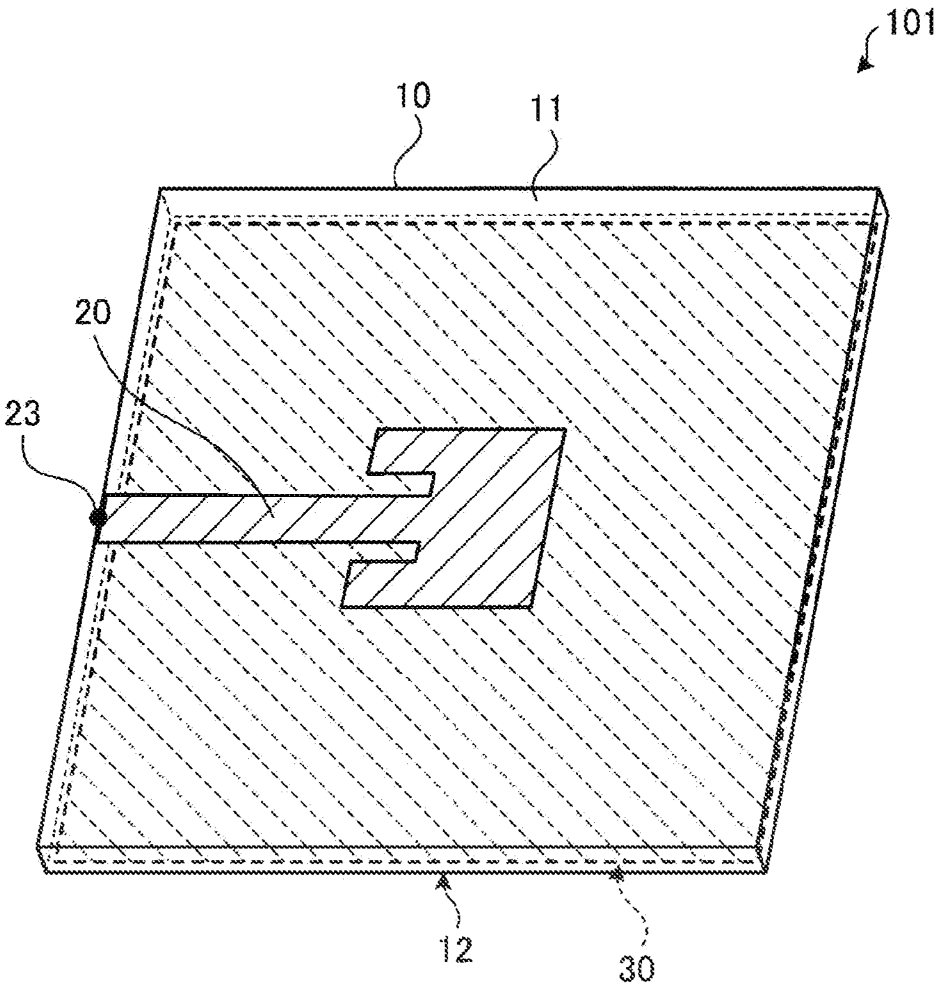
FIG. 4 is a top perspective view illustrating a configuration of an antenna in a reference example 2.

FIG. 4 is a top perspective illustrating a configuration of an antenna 101 in the reference example 2. As illustrated in FIG. 4, the antenna 101 of the reference example 2 includes the transparent dielectric member 10, the patch antenna 20, and the ground plane 30.

Here, the patch antenna 20 of the antenna 101 has a whole shape similar to that of the patch antenna 20 of the present embodiment. On the other hand, no hole portion 22 is formed in the patch antenna 20 of the antenna 101, and all regions of the patch antenna 20 include a uniform metal thin film.

Similarly, the ground plane 30 of the antenna 101 has a whole shape similar to that of the ground plane 30 of the present embodiment. On the other hand, no hole portion 32 is formed in the ground plane 30 of the antenna 101, and all regions of the ground plane 30 include a uniform metal thin film.

As described above, in the antenna 101 of the reference example 2, no hole portion 22 and no hole portion 32 are respectively formed in the patch antenna 20 and the ground plane 30, and thus, the transparency of the antenna 101 is low.

Figure 5A:
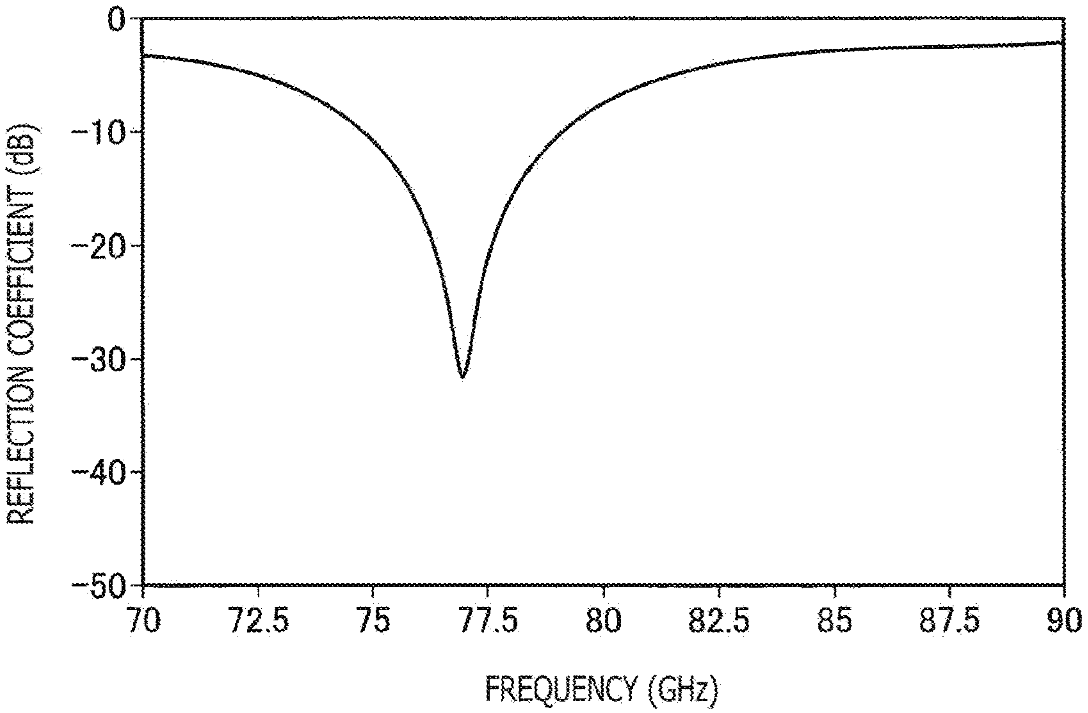
FIG. 5A is a graph illustrating a reflection characteristic relative to frequencies with respect to the antenna according to the embodiment of the present disclosure.

Subsequently, various kinds of antenna characteristics of the above-described antenna 1, antenna 100, and antenna 101 will be depicted. FIG. 5A is a graph illustrating a reflection characteristic relative to frequencies with respect to the antenna 1 according to the embodiment of the present disclosure. Note that various kinds of antenna reflection characteristics depicted below each depict a reflection characteristic at an input of 50 (Ω), which is used in general feeding lines.

As illustrated in FIG. 5A, the antenna 1 according to the present embodiment has a reflection minimum point in the vicinity of a frequency of 77 (GHz), and thus has a good characteristic as an antenna for transmitting/receiving millimeter-wave signals.

Figure 5B:
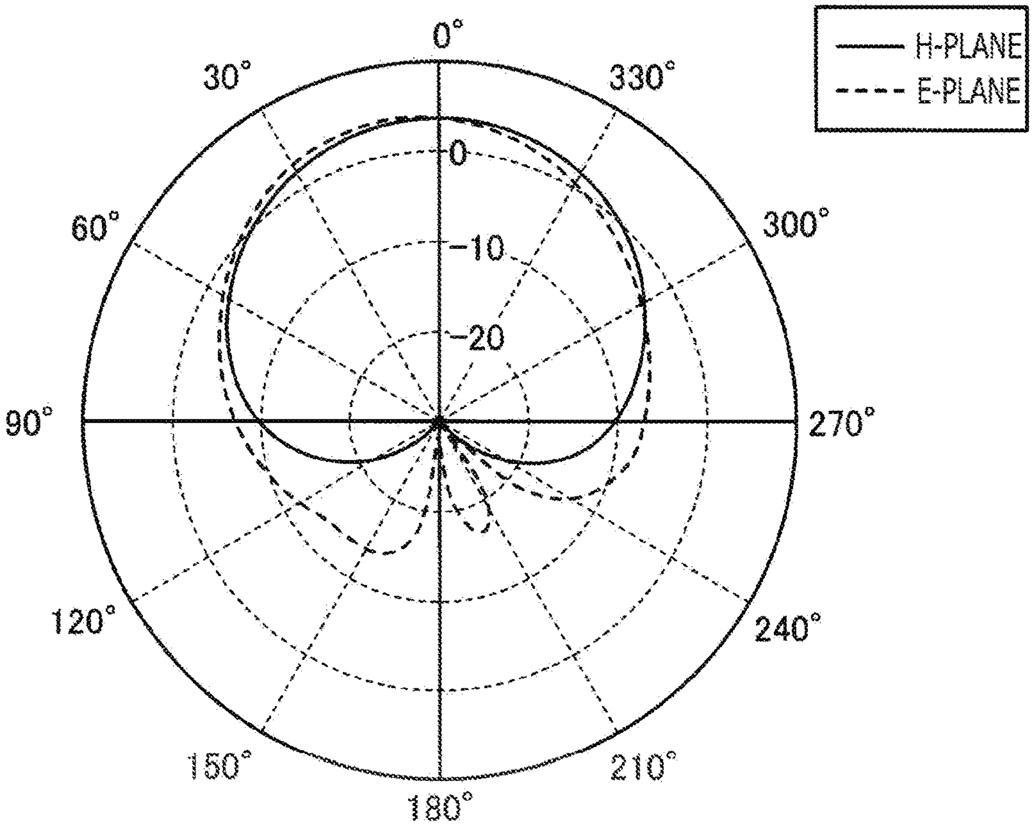
FIG. 5B is a graph illustrating radiation directivities of the antenna according to the embodiment of the present disclosure.

FIG. 5B is a graph illustrating radiation directivities of the antenna 1 according to the embodiment of the present disclosure. Note that, for radiation directivities depicted below with respect to the various kinds of antennas, the radiation directivity of the H-plane and the radiation directivity of the E-plane are illustrated in one graph.

As illustrated in FIG. 5B, for the antenna 1 according to the present embodiment, the radiation directivity of the H-plane is reduced within a region from 90 (°) to 270 (°), and thus, the radiation level backward is suppressed.

Figure 6A:
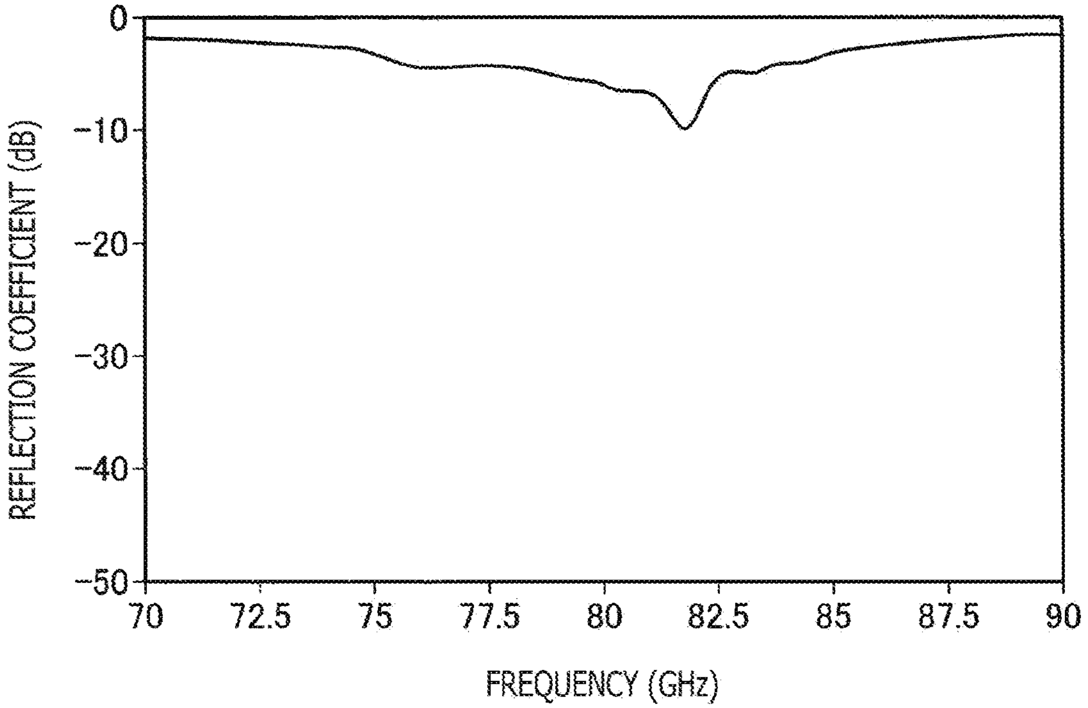
FIG. 6A is a graph illustrating a reflection characteristic relative to frequencies with respect to the antenna in the reference example 1.

FIG. 6A is a graph illustrating a reflection characteristic relative to frequencies with respect to the antenna 100 in the reference example 1. As illustrated in FIG. 6A, the antenna 100 in the reference example 1 has no reflection minimum point in the vicinity of the frequency of 77 (GHz), and thus has a large reflection loss as the antenna for transmitting/receiving millimeter-wave signals.

Note that the antenna 100 has no reflection minimum point in frequency bands other than the frequency band illustrated in FIG. 6A, and thus has a large reflection loss as even an antenna for transmitting/receiving signals other than the millimeter-wave signals.

Figure 6B:
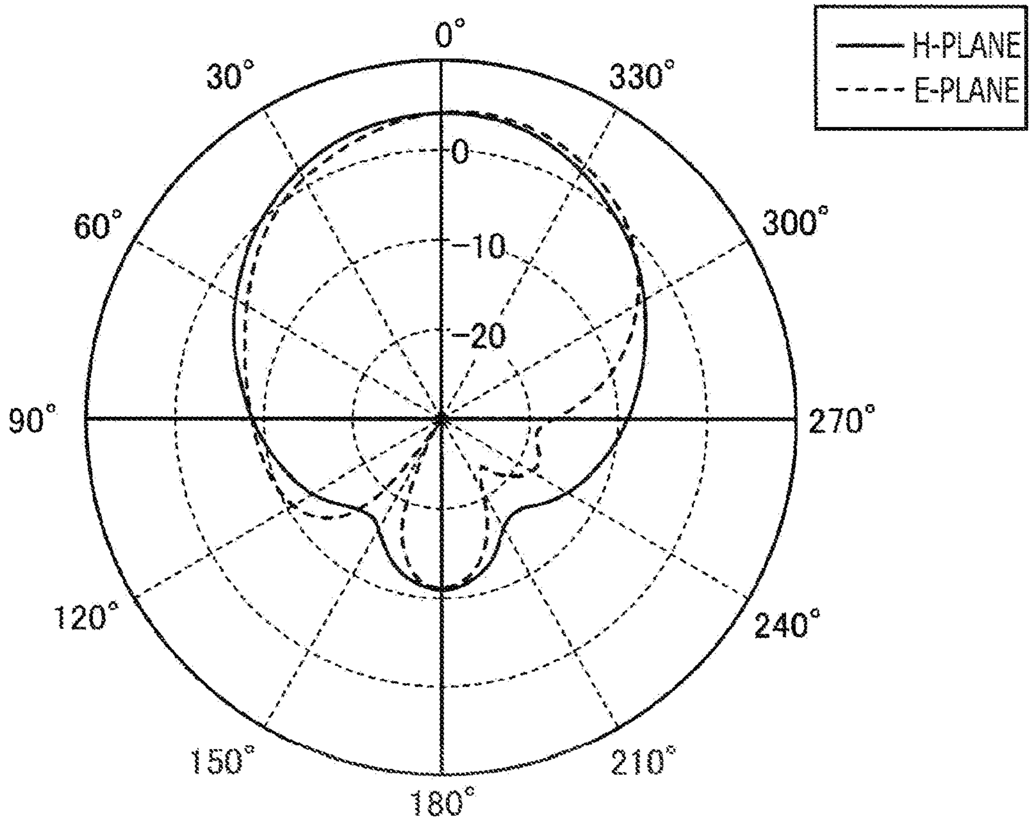
FIG. 6B is a graph illustrating radiation directivities of the antenna in the reference example 1.

FIG. 6B is a graph illustrating radiation directivities of the antenna 100 in the reference example 1. As illustrated in FIG. 6B, for the antenna 100 in the reference level 1, the radiation directivities of the H-plane and the E-plane have relatively large levels within the region from 90 (°) to 270 (°), and thus, the radiation level backward is not suppressed.

That is, the antenna 100 in the reference example 1 is an antenna for which transparency is high, but antenna efficiency is low.

Figure 7A:
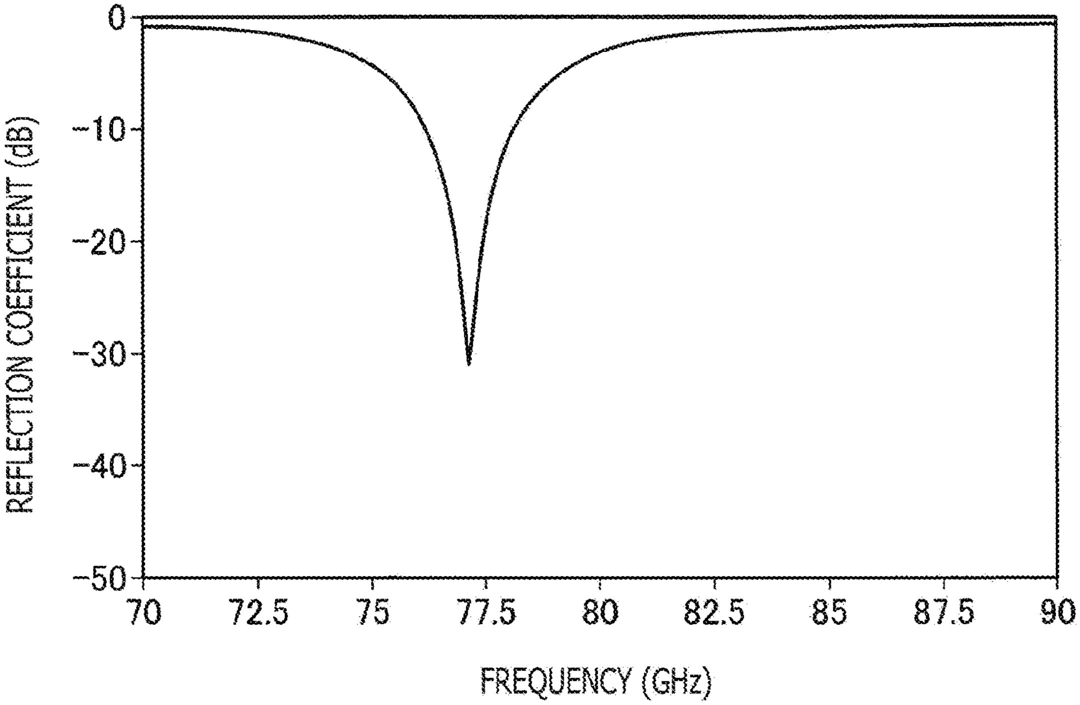
FIG. 7A is a graph illustrating a reflection characteristic relative to frequencies with respect to the antenna in the reference example 2.

FIG. 7A is a graph illustrating a reflection characteristic relative to frequencies with respect to the antenna 101 in the reference example 2. As illustrated in FIG. 7A, the antenna 101 in the reference example 2 has a reflection minimum point in the vicinity of the frequency of 77 (GHz), and thus has a good characteristic as the antenna for transmitting/receiving millimeter-wave signals.

Figure 7B:
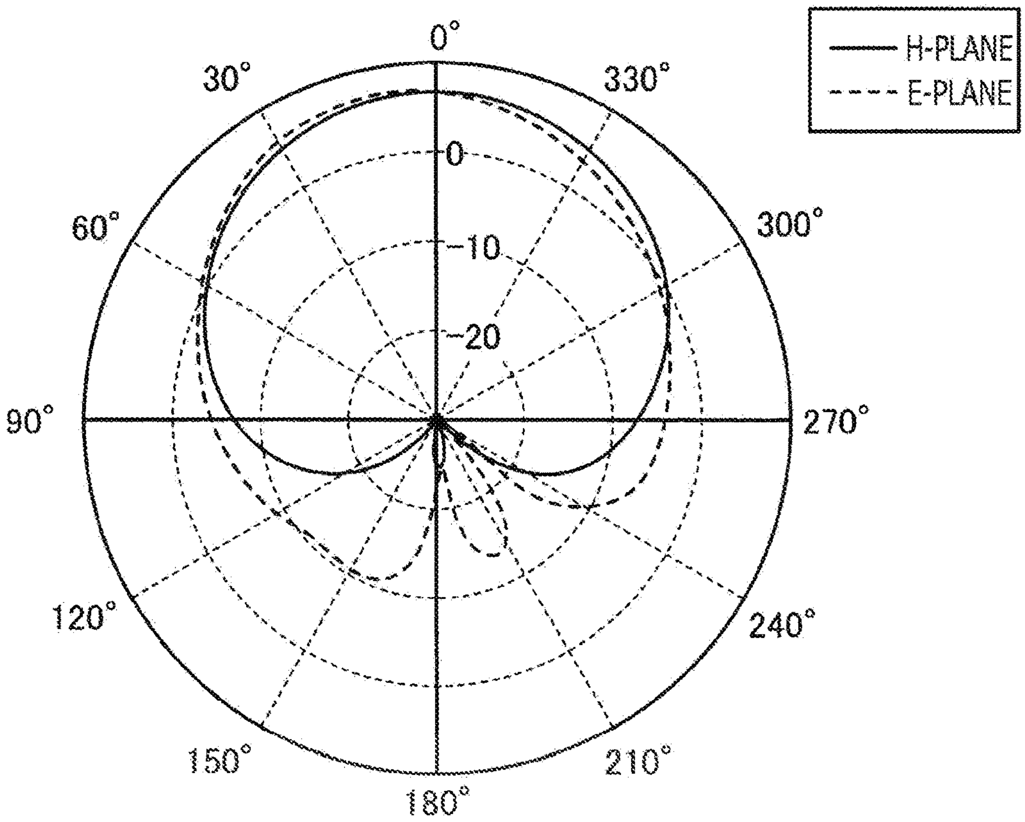
FIG. 7B is a graph illustrating radiation directivities of the antenna in the reference example 2.

FIG. 7B is a graph illustrating radiation directivities of the antenna 101 in the reference example 2. As illustrated in FIG. 7B, for the antenna 101 in the reference example 2, the radiation directivity of the H-plane is reduced within the region from 90 (°) to 270 (°), and thus, the radiation level backward is suppressed.

That is, the antenna 101 in the reference example 2 is an antenna for which the antenna efficiency is high, but the transparency is low. Further, as illustrated in FIGS. 5A and 7A, the antenna 1 according to the present embodiment and the antenna 101 in the reference example 2 have reflection characteristics similar to each other.

That is, in the present embodiment, disposing the transparent conductive film 40 at the hole portions 22 of the patch antenna 20, which are formed to secure high transparency, makes it possible to provide the antenna 1 with a reflection characteristic similar to that of the antenna 101 with the patch antenna 20 including the uniform metal thin film.

Here, for the antenna 101 with the patch antenna 20 including the uniform metal thin film, designing for matching with the feeding line according to the frequency of transmitted/received electromagnetic waves and the like is relatively easy.

Thus, in the present embodiment, matching with the feeding line can be facilitated such that the antenna 101 with the patch antenna 20 including the uniform metal thin film is first designed, the hole portions 22 are then disposed in the designed patch antenna 20, and finally, the transparent conductive film 40 is disposed at the hole portions 22.

Moreover, in the present embodiment, the transparent conductive film 40, which is transparent, is disposed at the hole portions 22 of the patch antenna 20, and thus, subsequently to the above, the high transparency of the antenna 1 can be secured. According to the present embodiment, therefore, the antenna 1 that has high transparency and that is capable of facilitating matching with the feeding line can be achieved.

Further, in the present embodiment, disposing the transparent conductive film 40 at the hole portions 22 of the patch antenna 20 enables suppression of the radiation level backward. According to the present embodiment, therefore, in a case where there is some object at the back side of the antenna 1, the influence of electromagnetic waves relative to the object can be reduced and the influence of electromagnetic waves reflected by the object on the antenna 1 can be reduced.

Further, in the present embodiment, the transparent conductive film 50 having conductivity is preferably disposed at the hole portions 32 of the ground plane 30, which are formed to secure high transparency. This configuration makes it possible to provide the antenna 1 with the reflection characteristic similar to that of the antenna 101 with the patch antenna 20 including the uniform metal thin film.

Further, in the present embodiment, the transparent conductive film 40 is preferably disposed so as to cover the hole portions 22 of the patch antenna 20. This configuration makes it possible to provide the antenna 1 with a reflection characteristic further similar to that of the antenna 101 with the patch antenna 20 including the uniform metal thin film.

Similarly, in the present embodiment, the transparent conductive film 50 is preferably disposed so as to cover the hole portions 32 of the ground plane 30. This configuration makes it possible to provide the antenna 1 with a reflection characteristic further similar to that of the antenna 101 with the ground plane 30 including the uniform metal thin film.

Note that, in the present embodiment, an example in which the hole portions 22 of the patch antenna 20 and the hole portions 32 of the ground plane 30 are both provided with the transparent conductive film 40 and the transparent conductive film 50, respectively, has been described, but the antenna 1 of the present embodiment is not limited to this example.

For example, only the hole portions 22 of the patch antenna 20 may be provided with the transparent conductive film 40, or only the hole portions 32 of the ground plane 30 may be provided with the transparent conductive film 50.

Further, in the present embodiment, the hole portions 22 are preferably disposed, inside the patch antenna 20, so as to be arrayed in a plurality of rows. In other words, the patch antenna 20 preferably includes a first conductive path that is formed along the periphery of the patch antenna 20, and a second conductive path that is formed, inside the patch antenna 20, along the hole portions 22 that are disposed so as to be arrayed in the plurality of rows.

This configuration makes it possible to, even in a case where transparent conductive film 40 having lower conductivity than metal is disposed inside the patch antenna 20, provide the antenna 1 with sufficient antenna characteristics.

Similarly, in the present embodiment, the hole portions 32 are preferably disposed, inside the ground plane 30, so as to be arrayed in a plurality of rows. In other words, the ground plane 30 preferably includes a first conductive path that is formed along the periphery of the ground plane 30, and a second conductive path that is formed, inside the ground plane 30, along the hole portions 32 that are disposed so as to be arrayed in the plurality of rows.

This configuration makes it possible to, even in a case where transparent conductive film 50 having lower conductivity than metal is disposed inside the ground plane 30, provide the antenna 1 with sufficient antenna characteristics.

Note that, in the present embodiment, the transparent conductive film 40 may be configured to be disposed not only at the hole portions 22 of the patch antenna 20, but also on the surface of the microstrip lines 21. On the contrary, in the present embodiment, the transparent conductive film 40 is preferably disposed so as not to run over the edge of a region enclosed by the microstrip lines 21.

This is because an electric current fed from the feeding point 23 flows along the periphery of an aggregate of microstrip lines 21 and transparent conductive film 40, but in a case where a transparent conductive film 40 runs over the periphery, a loss arises in an electric current flowing through the running-over transparent conductive film 40.

Further, in the present embodiment, each of the hole portions 22 of the patch antenna 20 preferably has a rectangular shape. This configuration makes it possible to, in a case where the shape of the patch antenna 20 includes an aggregate of rectangular shapes, array the hole portions 22 without waste, and thus enables enhancement of the transparency of the patch antenna 20.

Figure 8:
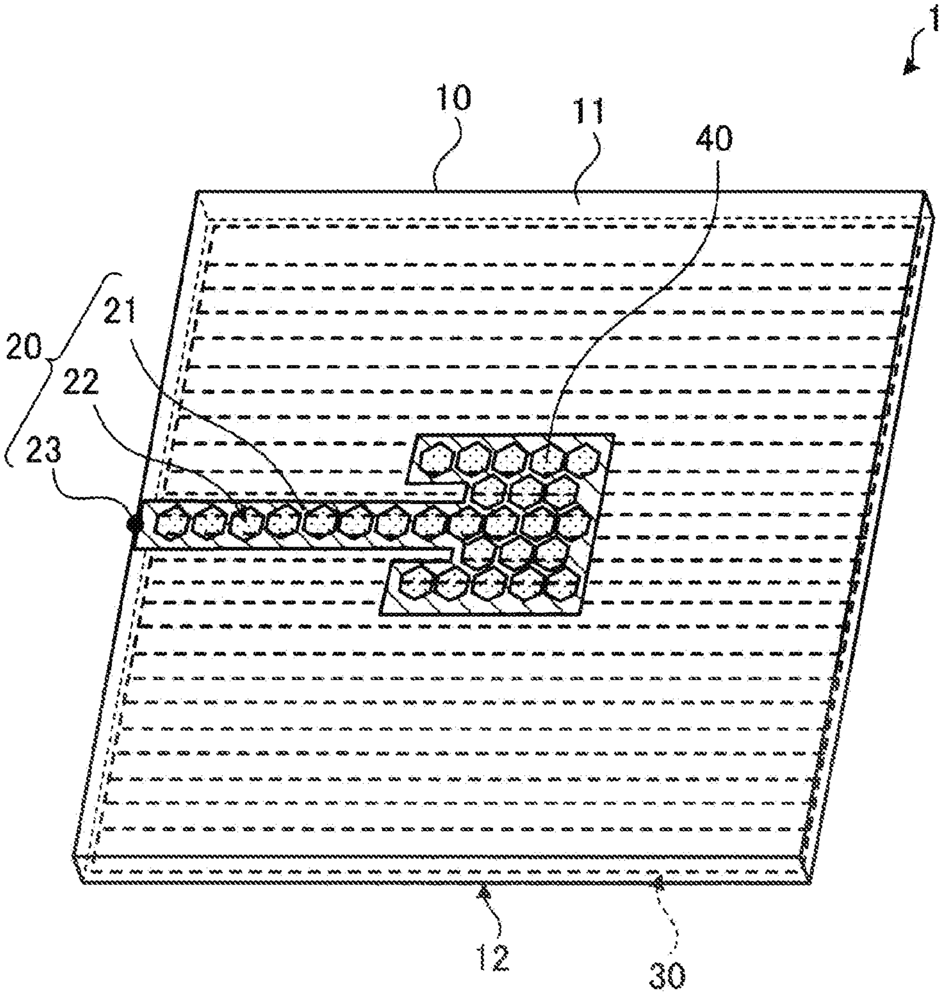
FIG. 8 is a top perspective view illustrating a configuration of an antenna according to a modification example 1 of the embodiment of the present disclosure.

Note that, in the antenna 1 of the present embodiment, each of the hole portions 22 of the patch antenna 20 may not have the rectangular shape. FIG. 8 is a top perspective view illustrating a configuration of the antenna 1 according to a modification example 1 of the embodiment of the present disclosure. As illustrated in FIG. 8, each of the hole portions 22 of the patch antenna 20 may have a hexagonal shape.

This configuration makes it possible to array, inside the patch antenna 20, the hole portions 22 without waste, and thus enables enhancement of the transparency of the patch antenna 20. Note that, in individual modification examples described hereinafter, the ground plane 30 has a configuration similar to that of the embodiment illustrated in FIG. 2.

Further, in the modification example 1, in a case where the wavelength of electromagnetic waves transmitted/received by the antenna 1 is denoted by λ, setting a radius r of each of the hole portions 22 into a range expressed by an inequality $\lambda/50<r<\lambda/50$ enables achievement of a good antenna characteristic.

Further, in the modification example 1, in a case where the width of each conductive path disposed between adjacent ones of the hole portions 22 is denoted by w, setting the width w into a range expressed by an inequality $w/(\sqrt{3}r)<0.3$ makes it possible to make transmittance of the patch antenna 20 equal to or larger than 70%, and thus enables achievement of high transparency.

Figure 9:
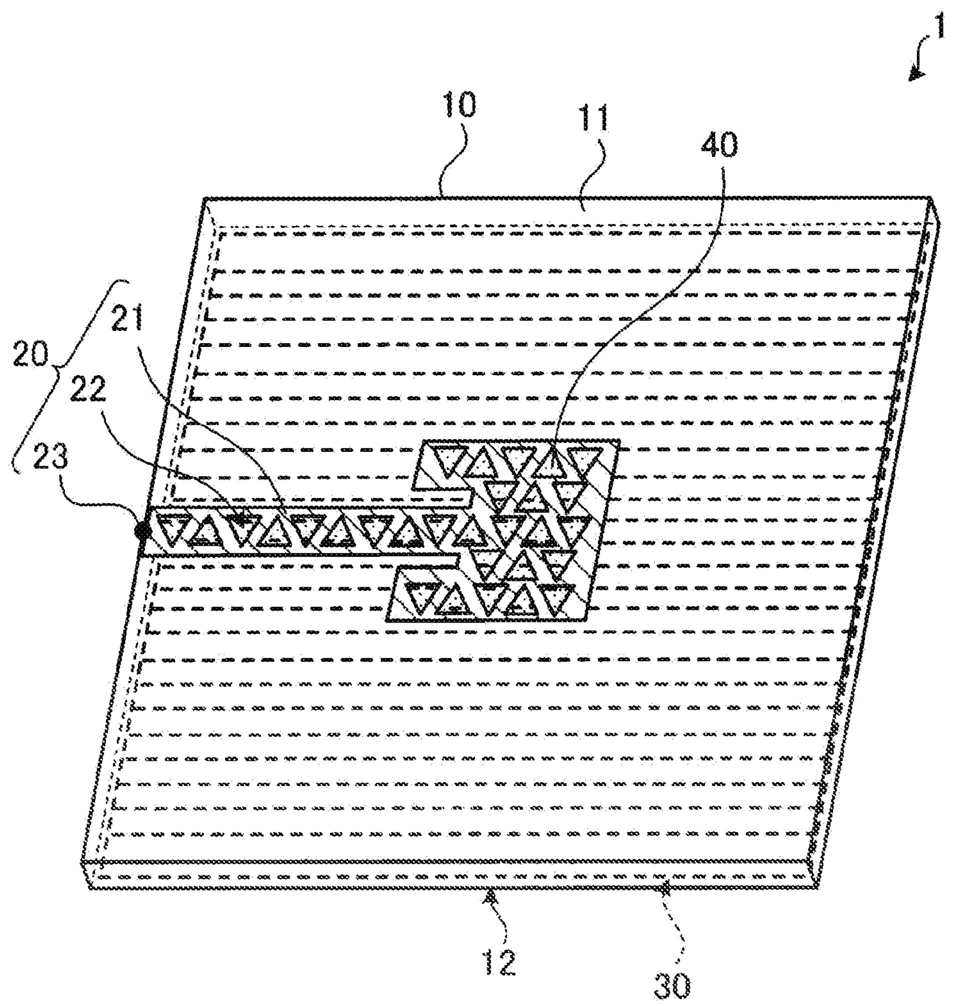
FIG. 9 is a top perspective view illustrating a configuration of an antenna according to a modification example 2 of the embodiment of the present disclosure.

FIG. 9 is a top perspective view illustrating a configuration of the antenna 1 according to a modification example 2 of the embodiment of the present disclosure. As illustrated in FIG. 9, each of the hole portions 22 of the patch antenna 20 may have a triangular shape. This configuration makes it possible to array, inside the patch antenna 20, the hole portions 22 without waste, and thus enables enhancement of the transparency of the patch antenna 20.

Figure 10:
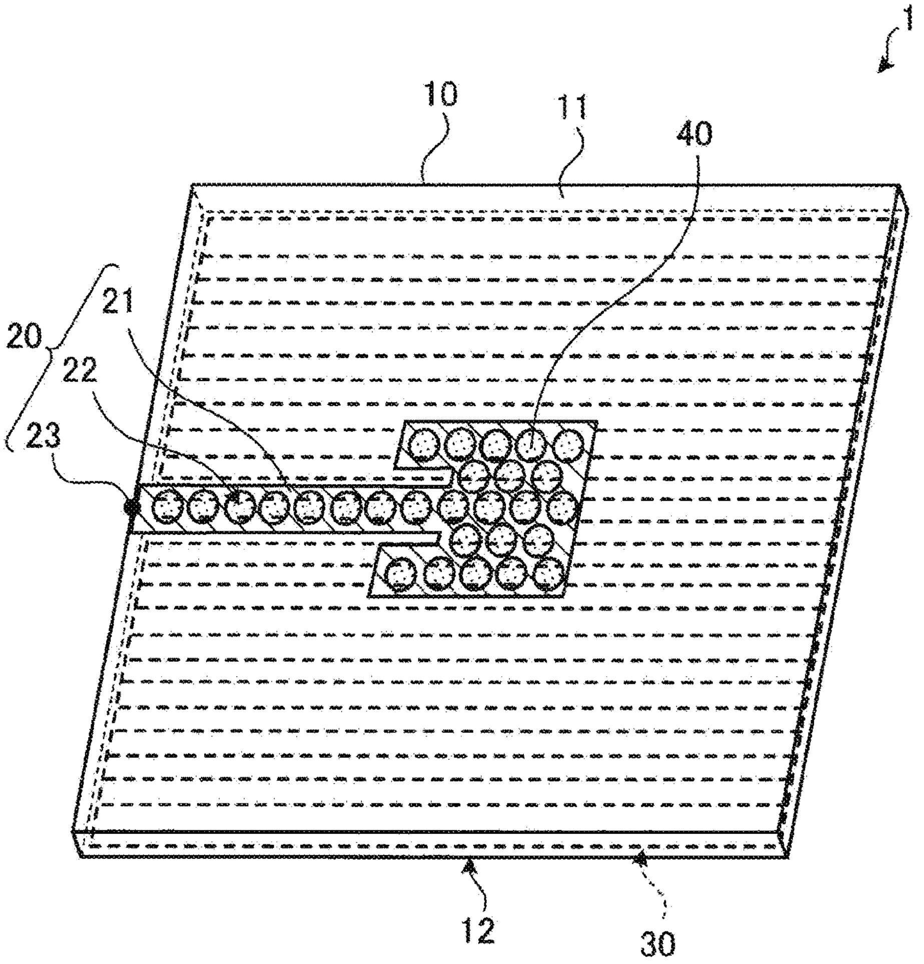
FIG. 10 is a top perspective view illustrating a configuration of an antenna according to a modification example 3 of the embodiment of the present disclosure.

FIG. 10 is a top perspective view illustrating a configuration of the antenna 1 according to a modification example 3 of the embodiment of the present disclosure. As illustrated in FIG. 10, each of the hole portions 22 of the patch antenna 20 may have a circular shape. This configuration makes it possible to array, inside the patch antenna 20, the hole portions 22 without waste, and thus enables enhancement of the transparency of the patch antenna 20.

Note that the shape of each of the hole portions 22 of the present embodiment is not limited to the rectangular shape, the hexagonal shape, the triangular and the circular shape, and may be any other shape (for example, a polygonal shape or an elliptical shape other than the above shapes). Further, the shapes of the plural hole portions 22 are not limited to uniform shapes of one kind, and may be a mix of a plurality of kinds of shapes.

Moreover, in the present embodiment, the shape of each of the hole portions 32 of the ground plane 30 is not limited to the rectangular shape illustrated in FIG. 2, and may be one of shapes similar to the various kinds of shapes with respect to each hole portion 22, which have been described so far.

[Effects]

The antenna 1 according to the present embodiment includes the plate-shaped transparent dielectric member 10, the patch antenna 20, the ground plane 30, and the transparent conductive film 40. The patch antenna 20 is disposed on the front face 11 of the transparent dielectric member 10 and includes, inside the patch antenna 20, the hole portions 22. The ground plane 30 is disposed on the back face 12 of the transparent dielectric member 10 and includes, inside the ground plane 30, the hole portions 32. The transparent conductive film 40 is disposed at the hole portions 22 of the patch antenna 20.

This configuration enables achievement of the antenna 1 that has high transparency and that is capable of facilitating matching with the feeding line.

Further, in the antenna 1 according to the present embodiment, the transparent conductive film 40 is disposed so as to cover the hole portions 22 of the patch antenna 20.

This configuration makes it possible to provide the antenna 1 with a reflection characteristic further similar to that of the antenna 101 with the patch antenna 20 including the uniform metal thin film.

Further, in the antenna 1 according to the present embodiment, the hole portions 22 of the patch antenna 20 are disposed so as to be arrayed in a plurality of rows.

This configuration makes it possible to, even in a case where transparent conductive film 40 having lower conductivity than metal is disposed inside the patch antenna 20, provide the antenna 1 with sufficient antenna characteristics.

Further, in the antenna 1 according to the present embodiment, the patch antenna 20 includes the first conductive path that is formed along the periphery of the patch antenna 20, and the second conductive path that is formed, inside the patch antenna 20, along the hole portions 22 that are disposed so as to be arrayed in the plurality of rows.

This configuration makes it possible to, even in a case where transparent conductive film 40 having lower conductivity than metal is disposed inside the patch antenna 20, provide the antenna 1 with sufficient antenna characteristics.

Further, the antenna 1 according to the present embodiment further includes the transparent conductive film 50 disposed at the hole portions 32 of the ground plane 30.

This configuration makes it possible to provide the antenna 1 with a reflection characteristic similar to that of the antenna 101 with the ground plane 30 including the uniform metal thin film.

Further, in the antenna 1 according to the present embodiment, the transparent conductive film 50 disposed at the hole portions 32 of the ground plane 30 is disposed so as to cover the hole portions 32.

This configuration makes it possible to provide the antenna 1 with a reflection characteristic further similar to that of the antenna 101 with the ground plane 30 including the uniform metal thin film.

Further, in the antenna 1 according to the present embodiment, the hole portions 22 of the patch antenna 20 each have the rectangular shape.

This configuration makes it possible to, in a case where the shape of the patch antenna 20 includes an aggregate of rectangular shapes, array the hole portions 22 without waste, and thus enables enhancement of the transparency of the patch antenna 20.

Further, in the antenna 1 according to the present embodiment, the hole portions 22 of the patch antenna 20 each have the hexagonal shape.

This configuration makes it possible to array the hole portions 22 without waste, and thus enables enhancement of the transparency of the patch antenna 20.

Further, in the antenna 1 according to the present embodiment, the hole portions 22 of the patch antenna 20 each have the triangular shape.

This configuration makes it possible to array the hole portions 22 without waste, and thus enables enhancement of the transparency of the patch antenna 20.

Further, in the antenna 1 according to the present embodiment, the hole portions 22 of the patch antenna 20 each have the circular shape.

This configuration makes it possible to array the hole portions 22 without waste, and thus enables enhancement of the transparency of the patch antenna 20.

[Millimeter-Wave Sensor]

Figure 11:
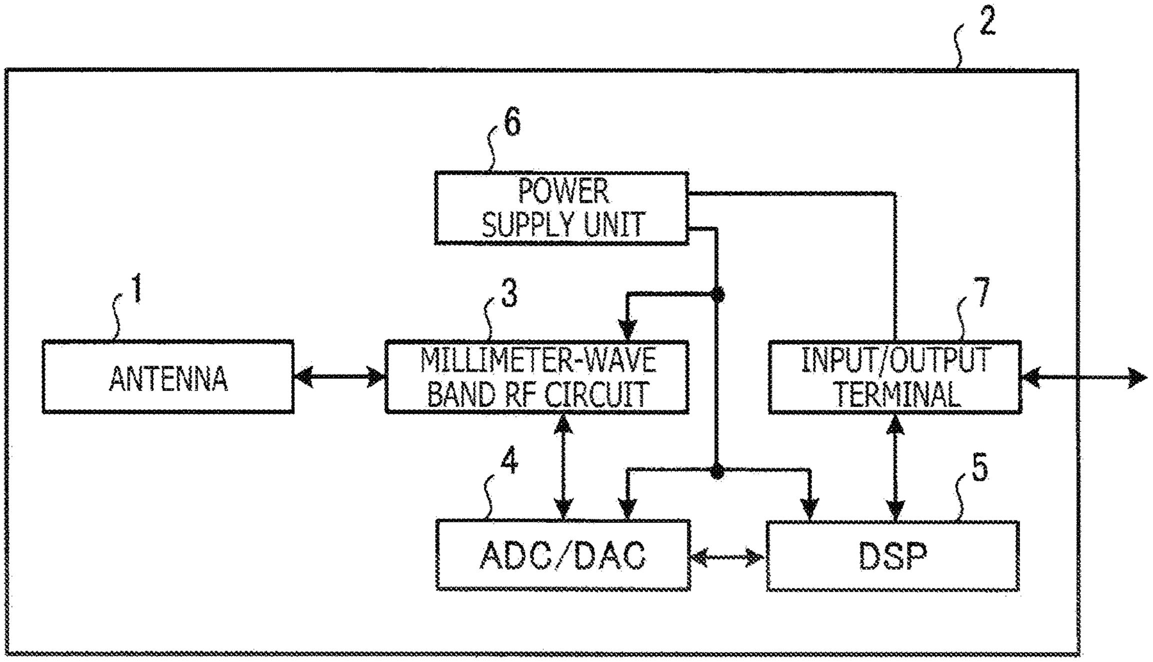
FIG. 11 is a block diagram illustrating an example of a schematic configuration of a millimeter-wave sensor according to an embodiment of the present disclosure.

FIG. 11 is a block diagram illustrating an example of a schematic configuration of a millimeter-wave sensor 2 according to an embodiment of the present disclosure. As illustrated in FIG. 11, the millimeter-wave sensor 2 according to the present embodiment includes the antenna 1, the millimeter-wave band RF circuit 3, an ADC/DAC 4, a DSP 5, a power supply unit 6, and an input/output terminal 7.

In the millimeter-wave sensor 2 illustrated in FIG. 11, a millimeter-wave signal having been generated in the millimeter-wave band RF circuit 3 is radiated from the antenna 1 to the outside. Further, the radiated millimeter-wave signal reaches and is reflected on a target measured object, and a reflected millimeter-wave signal is received by the antenna 1 again.

The received millimeter-wave signal includes a doppler signal due to a relative velocity difference, and thus, the millimeter-wave sensor 2 extracts the doppler signal by causing the millimeter-wave band RF circuit 3 to compare the received wave with the transmitted wave. Further, the extracted doppler signal is converted into a digital signal by an ADC of the ADC (Analogue-to-Digital Converter)/DAC (Digital-to-Analog Converter) 4.

The millimeter-wave sensor 2 detects a doppler frequency by causing the DSP (Digital Signal processor) 5 to perform Fourier conversion on the doppler signal having been converted into the digital signal. Further, by analyzing the detected doppler frequency, the millimeter-wave sensor 2 is capable of calculating relative operation statuses of the measured object, such as a relative velocity.

Further, the millimeter-wave sensor 2 is capable of outputting results of processing by the DSP 5 through the input/output terminal 7. Moreover, the millimeter-wave sensor 2 is also capable of causing the DSP 5 to perform processing on a digital signal input through the input/output terminal 7, causing the DAC of the ADC/DAC 4 to convert the processed input signal into an analog signal, and causing the analog signal to be transmitted to the millimeter-wave band RF circuit 3.

Further, the millimeter-wave sensor 2 according to the present embodiment uses the above-described antenna 1, and this configuration enables achievement of the millimeter-wave sensor 2 employing the antenna 1 that has high transparency and that is capable of facilitating matching with the feeding line.

Note that the effects described in the present description are just example effects, to which the effects of the present disclosure are not limited and may have other effects. Further, the antenna 1 according to the above embodiment is not limited to the above case where it is used in the millimeter-wave sensor 2, and can be used in other various devices.

It should be noted that the present technology can also have the following configurations.

(1)

An antenna including:

a plate-shaped transparent dielectric member;

a patch antenna disposed on a front face of the transparent dielectric member and including hole portions inside the patch antenna;

a ground plane disposed on a back face of the transparent dielectric member and including hole portions inside the ground plane; and a transparent conductive film disposed at the hole portions of the patch antenna.

(2)

The antenna according to (1), in which the transparent conductive film is disposed so as to cover the hole portions of the patch antenna.

(3)

The antenna according to (1) or (2), in which the hole portions of the patch antenna are disposed so as to be arrayed in a plurality of rows.

(4)
The antenna according to (3),
in which the patch antenna includes a first conductive path that is formed along a periphery of the patch antenna, and a second conductive path that is formed, inside the patch antenna, along the hole portions that are disposed so as to be arrayed in the plurality of rows.
(5)
The antenna according to any one of (1) to (4), further including:
a transparent conductive film disposed at the hole portions of the ground plane.
(6)
The antenna according to (5),
in which the transparent conductive film disposed at the hole portions of the ground plane is disposed so as to cover the hole portions of the ground plane.
(7)
The antenna according to any one of (1) to (6),
in which the hole portions of the patch antenna each have a rectangular shape.
(8)
The antenna according to any one of (1) to (6),
in which the hole portions of the patch antenna each have a hexagonal shape.
(9)
The antenna according to any one of (1) to (6),
in which the hole portions of the patch antenna each have a triangular shape.
(10)
The antenna according to any one of (1) to (6),
in which the hole portions of the patch antenna each have a circular shape.
(11)
A millimeter-wave sensor including:
a millimeter-wave band RF circuit that generates a millimeter-wave signal; and
an antenna that transmits/receives the millimeter-wave signal,
in which the antenna includes
a plate-shaped transparent dielectric member,
a patch antenna disposed on a front face of the transparent dielectric member and including hole portions inside the patch antenna,
a ground plane disposed on a back face of the transparent dielectric member and including hole portions inside the ground plane, and
a transparent conductive film disposed at the hole portions of the patch antenna.
(12)
The millimeter-wave sensor according to (11),
in which the transparent conductive film is disposed so as to cover the hole portions of the patch antenna.
(13)
The millimeter-wave sensor according to (11) or (12),
in which the hole portions of the patch antenna are disposed so as to be arrayed in a plurality of rows.
(14)
The millimeter-wave sensor according to (13),
in which the patch antenna includes a first conductive path that is formed along a periphery of the patch antenna, and a second conductive path that is formed, inside the patch antenna, along the hole portions that are disposed so as to be arrayed in the plurality of rows.
(15)
The millimeter-wave sensor according to any one of (11) to (14), further including:
a transparent conductive film disposed at the hole portions of the ground plane.
(16)
The millimeter-wave sensor according to (15),
in which the transparent conductive film disposed at the hole portions of the ground plane is disposed so as to cover the hole portions of the ground plane.
(17)
The millimeter-wave sensor according to any one of (11) to (16),
in which the hole portions of the patch antenna each have a rectangular shape.
(18)
The millimeter-wave sensor according to any one of (11) to (16),
in which the hole portions of the patch antenna each have a hexagonal shape.
(19)
The millimeter-wave sensor according to any one of (11) to (16),
in which the hole portions of the patch antenna each have a triangular shape.
(20)
The millimeter-wave sensor according to any one of (11) to (16),
in which the hole portions of the patch antenna each have a circular shape.

REFERENCE SIGNS LIST

1: Antenna
2: Millimeter-wave sensor
3: Millimeter-wave band RF circuit
10: Transparent dielectric member
11: Front face
12: Back face
20: Patch antenna
21: Microstrip line
22: Hole portion
23: Feeding point
30: Ground plane
31: Conductive member
32: Hole portion
40: Transparent conductive film
50: Transparent conductive film

The invention claimed is:

1. An antenna, comprising:
a plate-shaped transparent dielectric member;
a patch antenna disposed on a front face of the transparent dielectric member and including hole portions inside the patch antenna;
a ground plane disposed on a back face of the transparent dielectric member and including hole portions inside the ground plane; and
a transparent conductive film disposed at the hole portions of the patch antenna.

2. The antenna according to claim 1,
wherein the transparent conductive film is disposed so as to cover the hole portions of the patch antenna.

3. The antenna according to claim 1,
wherein the hole portions of the patch antenna are disposed so as to be arrayed in a plurality of rows.

4. The antenna according to claim 3,
wherein the patch antenna includes a first conductive path that is formed along a periphery of the patch antenna, and a second conductive path that is formed, inside the patch antenna, along the hole portions.

5. The antenna according to claim 1, further comprising:

a transparent conductive film disposed at the hole portions of the ground plane.

6. The antenna according to claim 5, wherein the transparent conductive film disposed at the hole portions of the ground plane is disposed so as to cover the hole portions of the ground plane.

7. The antenna according to claim 1, wherein the hole portions of the patch antenna each have a rectangular shape.

8. The antenna according to claim 1, wherein the hole portions of the patch antenna each have a hexagonal shape.

9. The antenna according to claim 1, wherein the hole portions of the patch antenna each have a triangular shape.

10. The antenna according to claim 1, wherein the hole portions of the patch antenna each have a circular shape.

11. A millimeter-wave sensor, comprising:

a millimeter-wave band RF circuit that generates a millimeter-wave signal; and an antenna that transmits/receives the millimeter-wave signal, wherein the antenna includes a plate-shaped transparent dielectric member, a patch antenna disposed on a front face of the transparent dielectric member and including hole portions inside the patch antenna, a ground plane disposed on a back face of the transparent dielectric member and including hole portions inside the ground plane, and a transparent conductive film disposed at the hole portions of the patch antenna.

* * * * *